(12) United States Patent
Lane et al.

(10) Patent No.: US 7,229,287 B2
(45) Date of Patent: Jun. 12, 2007

(54) SPATIAL MEMORY ASSESSMENT AND ASSOCIATED METHODS

(75) Inventors: Andre C. Lane, San Antonio, TX (US); Lisa W. Drozdick, San Antonio, TX (US); James A. Holdnack, Bear, DE (US)

(73) Assignee: Harcourt Assessment, Inc., San Antonio, TX (US)

( * ) Notice: Subject to any disclaimer, the term of this patent is extended or adjusted under 35 U.S.C. 154(b) by 18 days.

(21) Appl. No.: 11/117,050

(22) Filed: Apr. 28, 2005

(65) Prior Publication Data

US 2006/0246405 A1 Nov. 2, 2006

(51) Int. Cl.
*G09B 19/00* (2006.01)
(52) U.S. Cl. ...................................... 434/236
(58) Field of Classification Search .............. 434/128, 434/129, 236–237, 322, 327, 333; 273/272, 273/296, 302, 305, 308; 600/300
See application file for complete search history.

(56) References Cited

U.S. PATENT DOCUMENTS

| | | | | |
|---|---|---|---|---|
| 5,190,296 A | * | 3/1993 | Sainsbury | 273/296 |
| 5,190,298 A | * | 3/1993 | Lee et al. | 273/430 |
| 6,099,318 A | * | 8/2000 | McLeod et al. | 434/129 |
| 6,409,512 B1 | * | 6/2002 | Catto | 434/167 |
| 6,601,850 B1 | * | 8/2003 | Ross | 273/273 |
| 6,641,402 B2 | * | 11/2003 | Boggs | 434/236 |
| 6,695,311 B2 | * | 2/2004 | Yu et al. | 273/273 |
| 6,899,542 B2 | * | 5/2005 | Kurokawa | 434/236 |
| 7,001,183 B2 | * | 2/2006 | Dowrick | 434/178 |
| 7,011,526 B2 | * | 3/2006 | Boon | 434/236 |
| 7,070,563 B2 | * | 7/2006 | Buschke | 600/300 |

* cited by examiner

*Primary Examiner*—Kurt Fernstrom
(74) *Attorney, Agent, or Firm*—Allen, Dyer, Doppell, Milbrath & Gilchrist, P.A.

(57) ABSTRACT

A neuropsychological assessment includes cards having a first indicium on a top face and an index indicium on a bottom face. A display includes an arrangement of images, each image corresponding to one of the first indicia, the image number fewer than or equal to the card number. A receptacle has depressions for holding a card, each having an aperture therethrough positioned commensurate with the index indicium's location. At least some of the depressions are positioned analogously to the display arrangement. A trial is administered by revealing the display to an examinee. The display is removed from examinee view, and the examinee is instructed to reproduce the arrangement of the images by selecting a card having a first indicium corresponding to an image and placing the selected card within a selected depression on the receptacle in a position that corresponds to a position of the corresponding image on the display.

15 Claims, 7 Drawing Sheets

Trial 5
Say, Look carefully at the designs and remember where they are on the page.
Present this page for 10 seconds.
Do not reorient the child to the page if he or she appears off-task.
After 10 seconds, turn to the blank page following Trial 5.

35

Memory for Designs                          Trial 5

FIG. 4

SPATIAL MEMORY ASSESSMENT AND ASSOCIATED METHODS

FIELD OF INVENTION

The present invention generally relates to neuropsychological assessments, and, in particular, to systems and methods for assessing spatial memory.

BACKGROUND

Neuropsychological assessments can be given to individuals to test several aspects of cognitive development. An exemplary assessment that has been used in the past included cards having abstract designs on a top face and a card identifier on a bottom face. The examinee, as part of the assessment, is asked to reproduce a previously viewed pattern by placing some of the cards onto a flat grid. The assessment was scored by recording the card identifiers corresponding to the cards used and their relative positions on the grid.

A problem that existed with this assessment was the excessive amount of time it took for an examiner to record the card identifiers and positions, since each card had to be turned over individually. Another problem was the tendency for an examinee to be inexact with card placement. Yet a further problem was the possibility for the examinee to place more than one card in a single grid cell.

SUMMARY OF THE INVENTION

One aspect of the present invention is directed to a neuropsychological assessment. The neuropsychological assessment comprises a plurality of cards. Each card has a unique first indicium on a top face and a corresponding unique index indicium on a bottom face. Each index indicium is positioned in a substantially same location on each card.

The assessment further comprises a display. The display comprises an arrangement of a plurality of images. Each image corresponds to one and only one of the first indicia. A number of the images is fewer than or equal to a number of the cards.

A substantially planar receptacle comprises a plurality of depressions that are dimensioned for holding a unitary card therein. Each depression has an aperture therethrough that is positioned commensurate with the location of the index indicium. At least some of the depressions are positioned analogously to the display arrangement.

A trial or item is administered by revealing the display to an examinee for a first predetermined period of time. The display is then removed from examinee view, and the examinee is instructed to reproduce the arrangement of the plurality of images. This is accomplished by permitting the examinee to select a card having a first indicium corresponding to an image and placing the selected card within a selected depression on the receptacle. The selected card should be placed in a position that corresponds to a position of the corresponding image on the display.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 4 is a reproduction of an exemplary page of administration instructions for the display of FIG. 3.

DETAILED DESCRIPTION OF THE PREFERRED EMBODIMENTS

A description of the preferred embodiments of the present invention will now be presented with reference to FIGS. 1–7.

One aspect of the present invention is directed to a neuropsychological assessment 10 and methods for delivering and scoring same. This exemplary trial is designed to assess spatial memory for novel visual material, and, in a delayed response embodiment, long-term visuospatial memory. Typically the assessment is packaged for delivery and comprises a plurality of elements, including, but not intended to be limited to, a stimulus book, an administration manual, a record form book, a card receptacle, and a set of image cards.

Figure 1:
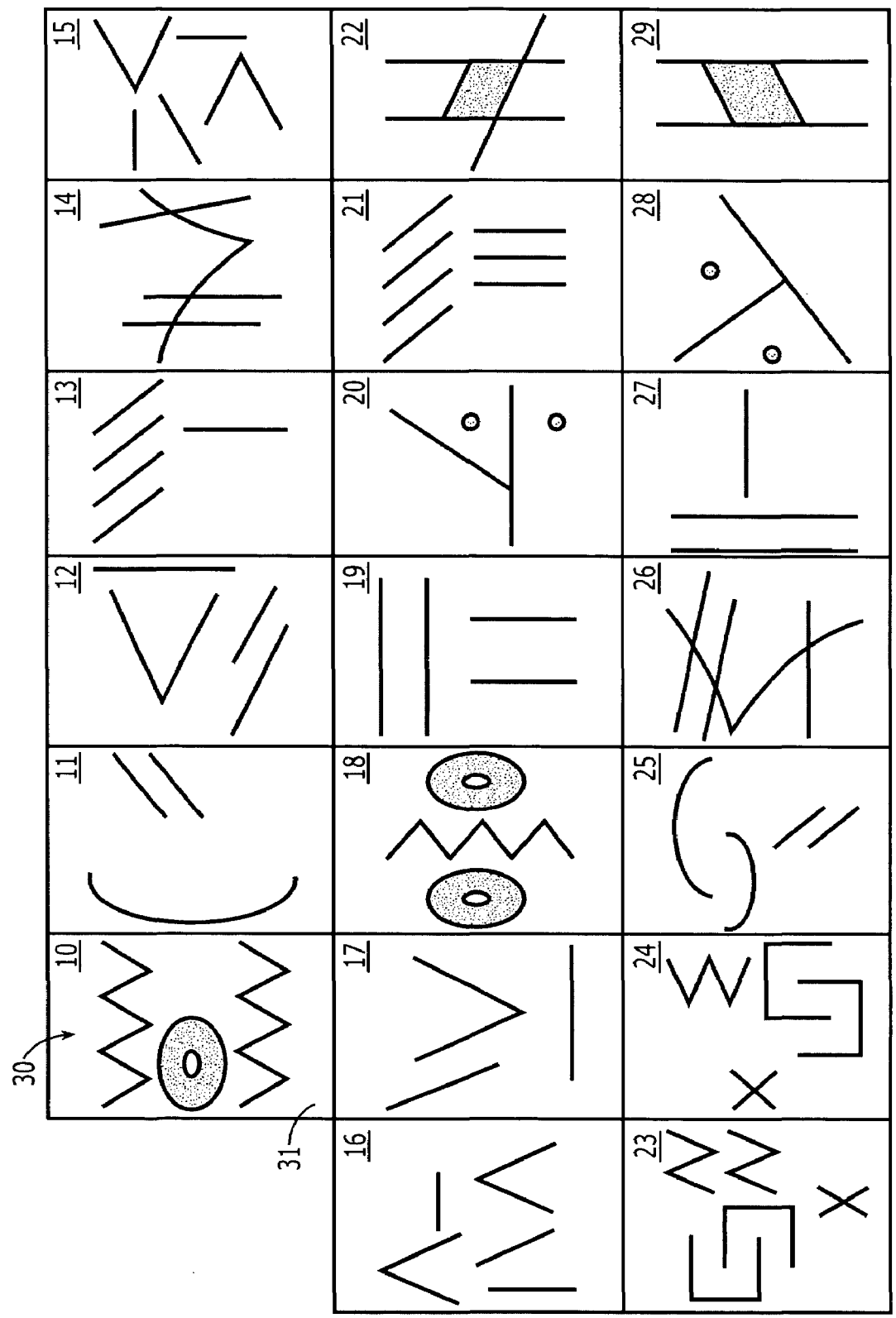
FIG. 1 illustrates a top plan view of an exemplary set of cards.
Figure 2:
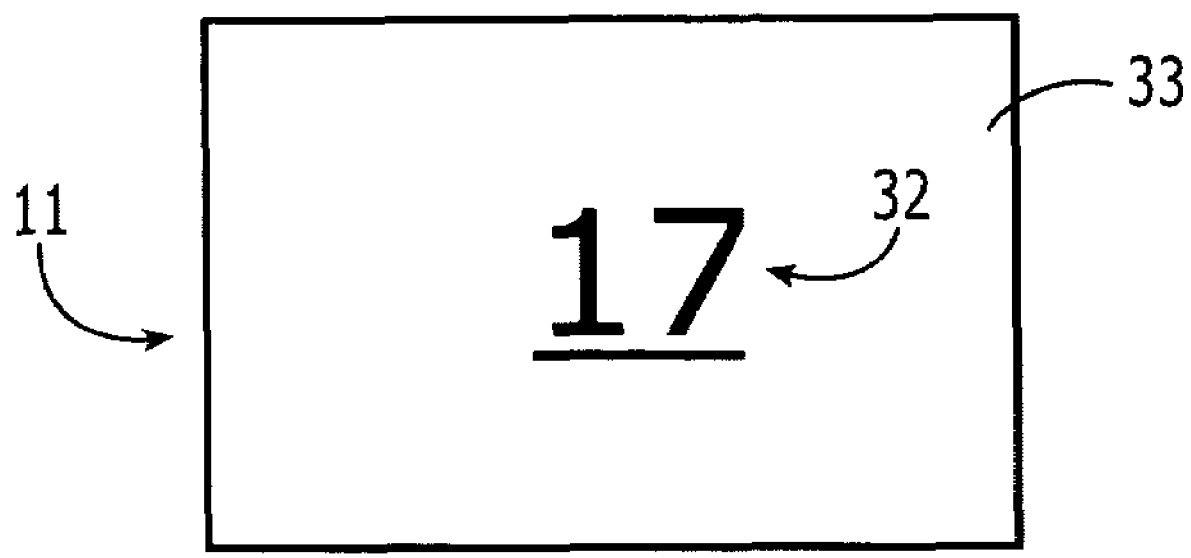
FIG. 2 illustrates a bottom plan view of an exemplary card.
Figure 3:
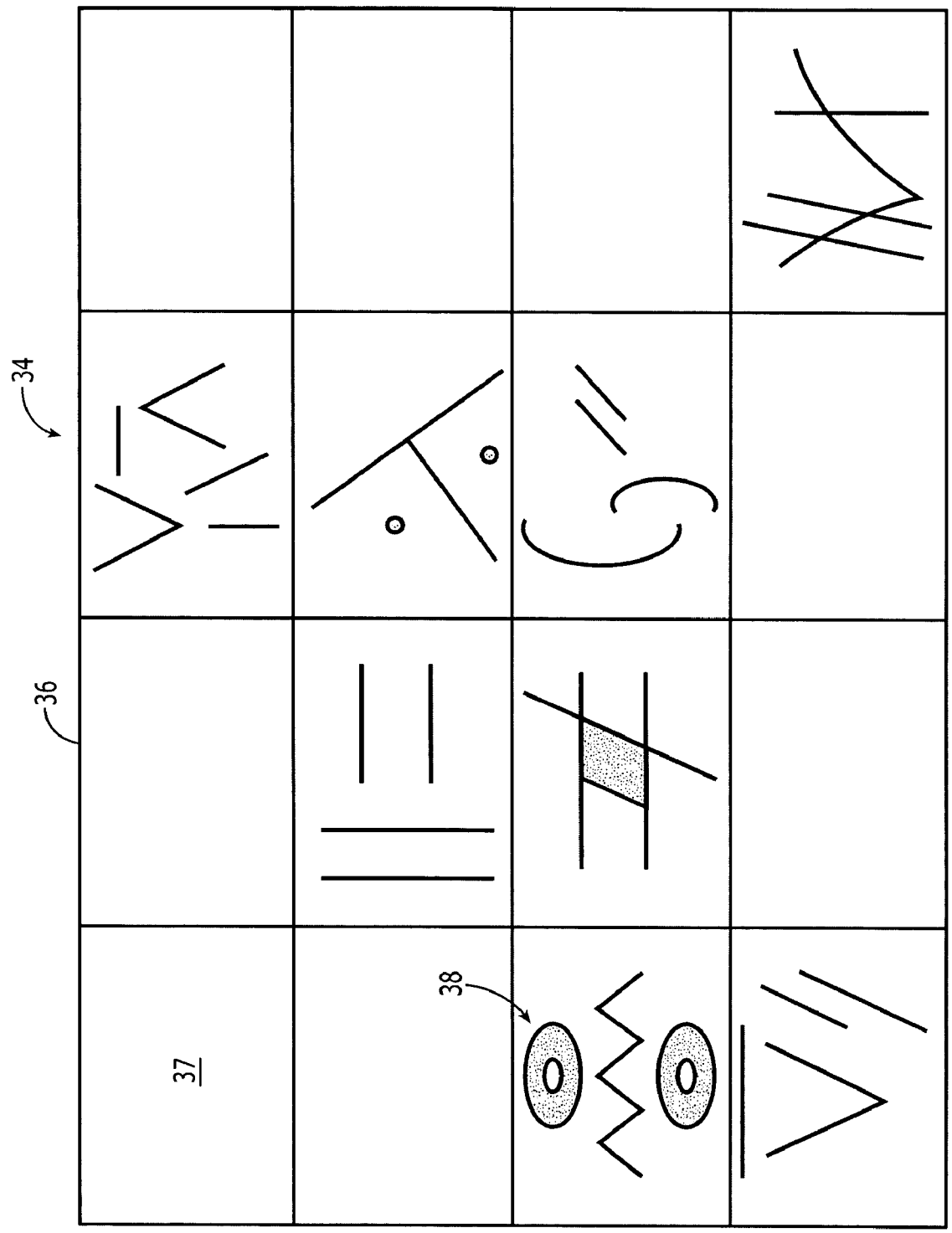
FIG. 3 is a reproduction of an exemplary display page.
Figure 5:
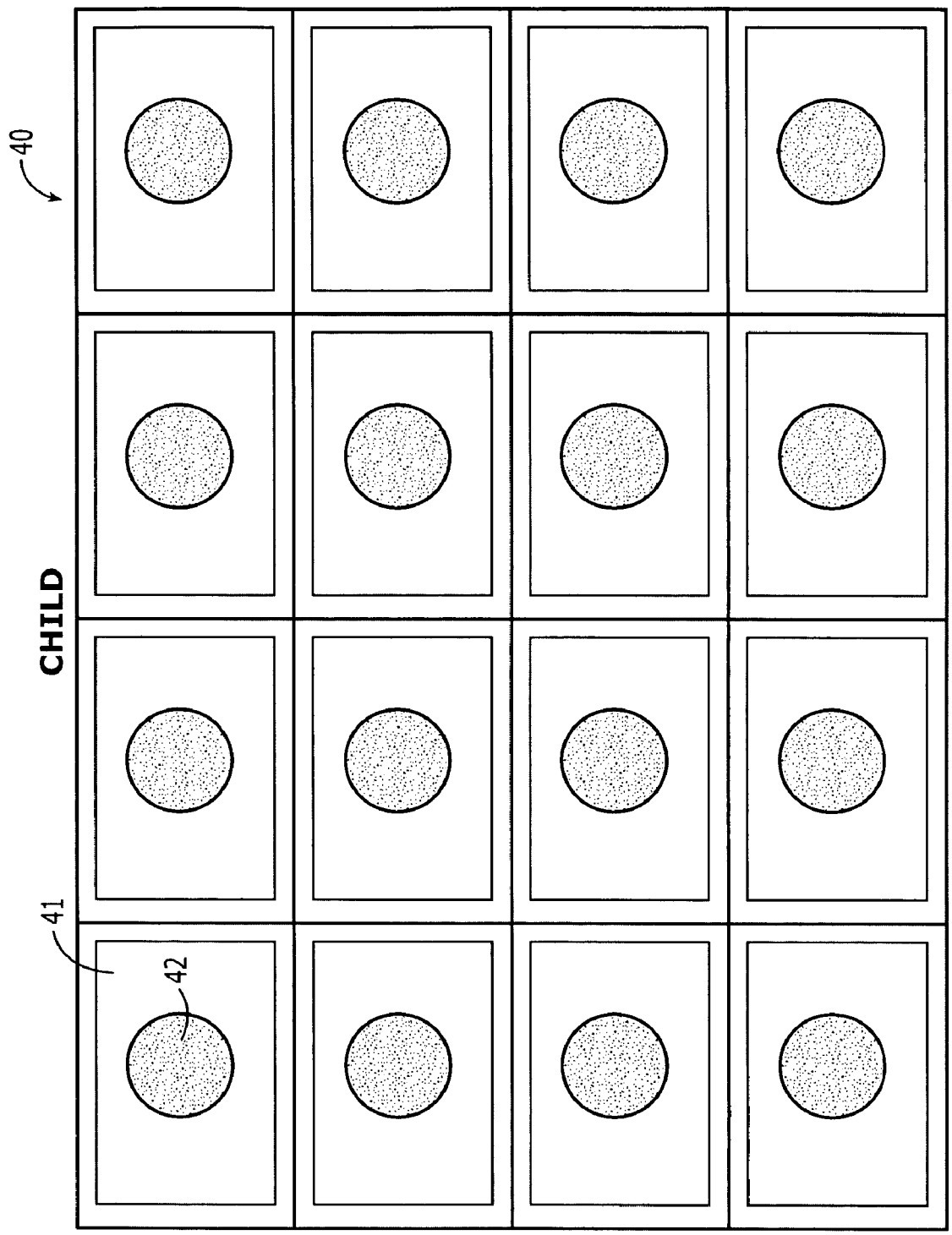
FIG. 5 is a top plan view of a receptacle.
Figure 6:
FIG. 6 is a reproduction of an exemplary assessment recordation sheet.

An exemplary set of cards 10–29 is illustrated in FIG. 1. This exemplary set comprises 20 cards, although this is not intended as a limitation. Each card 10–29 has a unique first indicium 30 on a top face 31 and a corresponding unique index indicium 32 on a bottom face 33 (FIG. 2). At least some of the first indicia 30 may comprise one or more colored elements. Each index indicium 32 is positioned in a substantially same location on each card 10–29.

In the particular embodiment illustrated, the first indicia 30 comprise abstract designs, and the index indica 32 comprise numbers. This, however, is not intended as a limitation, and one of skill in the art will recognize that any unique indicia may be contemplated for use in an assessment; for example, the index indicia 32 may comprise letters.

The assessment further comprises a display. In the exemplary embodiment described herein, the display comprises an arrangement of a plurality of images printed on a page in the stimulus book. Such a stimulus book is well known in the art, and typically includes a top spiral-bound book that has a built-in easel-type device so that the book can be displayed upright, with the examinee viewing one side of a page and the examiner viewing the other side. In this case, the display 34 is facing the examinee (FIG. 3), and administration instructions 35 are provided for the examiner (FIG. 4).

The display 34 (FIG. 3) includes a grid 36, here, a 4×4 grid of rectangles 37. Placed within at least some of the rectangles 37 are images 38, each of which corresponds to one and only one of the first indicia 30. A number of the images 38 is fewer than a number of the cards 10–29. The reverse side of the display page 34 may be a blank page, the use of which will be discussed in the following.

An exemplary receptacle 40 (FIG. 5) can be substantially planar, and can comprise a plurality of depressions 41 that are dimensioned for holding a unitary card 10–29 therein. Each depression 41 has an aperture 42 therethrough that is positioned commensurate with the location of the index indicium 32 on the back of each card 10–29. At least some of the depressions 41 are positioned analogously to the display arrangement. In this exemplary embodiment, the depressions 41 are arranged in a grid pattern, here, a 4×4 grid. Preferably, each depression 41 is dimensioned for holding a card 10–29 with sufficient force that the cards 10–29 are retainable within a depression 41 if the receptacle 40 is turned over, for example.

The record form book that is provided typically comprises at least one page 43 (FIG. 6) having at least one trial recordation element 44. The score recordation page 43 comprises an image 45 of the receptacle 40, here a 4×4 rectangular grid or chart.

A method of administering a trial of the present invention includes the steps of revealing a display 34 to an examinee for a first predetermined period of time, for example, 10 seconds. The display 34 in FIG. 3, for example, shows eight images. The examiner provides instructions to the examinee, for example, by reading the associated verbiage on the instruction page 35.

After the predetermined period of time, the display 34 is removed from examinee view, such as, for example, flipping the instruction page 35 forward, revealing the blank page on the other side to the examinee. The examinee is instructed to reproduce the arrangement of the plurality of images 38 that had been presented on the display 34. This is accomplished by giving the examinee a plurality of cards, for example, a subset of the complete set of cards 10–29. In this particular exemplary trial of FIG. 3, the examinee will have been given 16 out of the 20 cards. The number of cards given to the examinee must be greater than or equal to the number of images 38 in the display 34.

The examinee selects a card having a first indicium 30 corresponding to an image 38 and places the selected card within a selected depression 41 on the receptacle 40. The selected card should be placed in a position and orientation that corresponds to a position of the corresponding image 38 on the display 34. In an alternate embodiment, the card's orientation is not a factor. This process is repeated until the examinee is satisfied that the display 34 has been reproduced within the receptacle 40.

The trial is recorded by turning the receptacle 40 over and recording on the recordation sheet grid image 45 a location and value of each index indicium 32 that is visible through the apertures 42 on the receptacle 40.

One of skill in the art will appreciate that the number of cards given to the examinee and the number of images presented in the display is variable, and that the invention is not intended to be limited thereby. For example, in an early trial, four images may be presented and four cards provided for placement on the receptacle.

Another associated method of the present invention is analogous to the above. In this embodiment, the examinee is informed that a display 34 should be remembered for a longer period of time. One or more other trials, of the same or another type of subtest, are then administered, and after an imposed delay, the examinee is asked to recreate the display 34 in the same manner as above.

Figure 7:
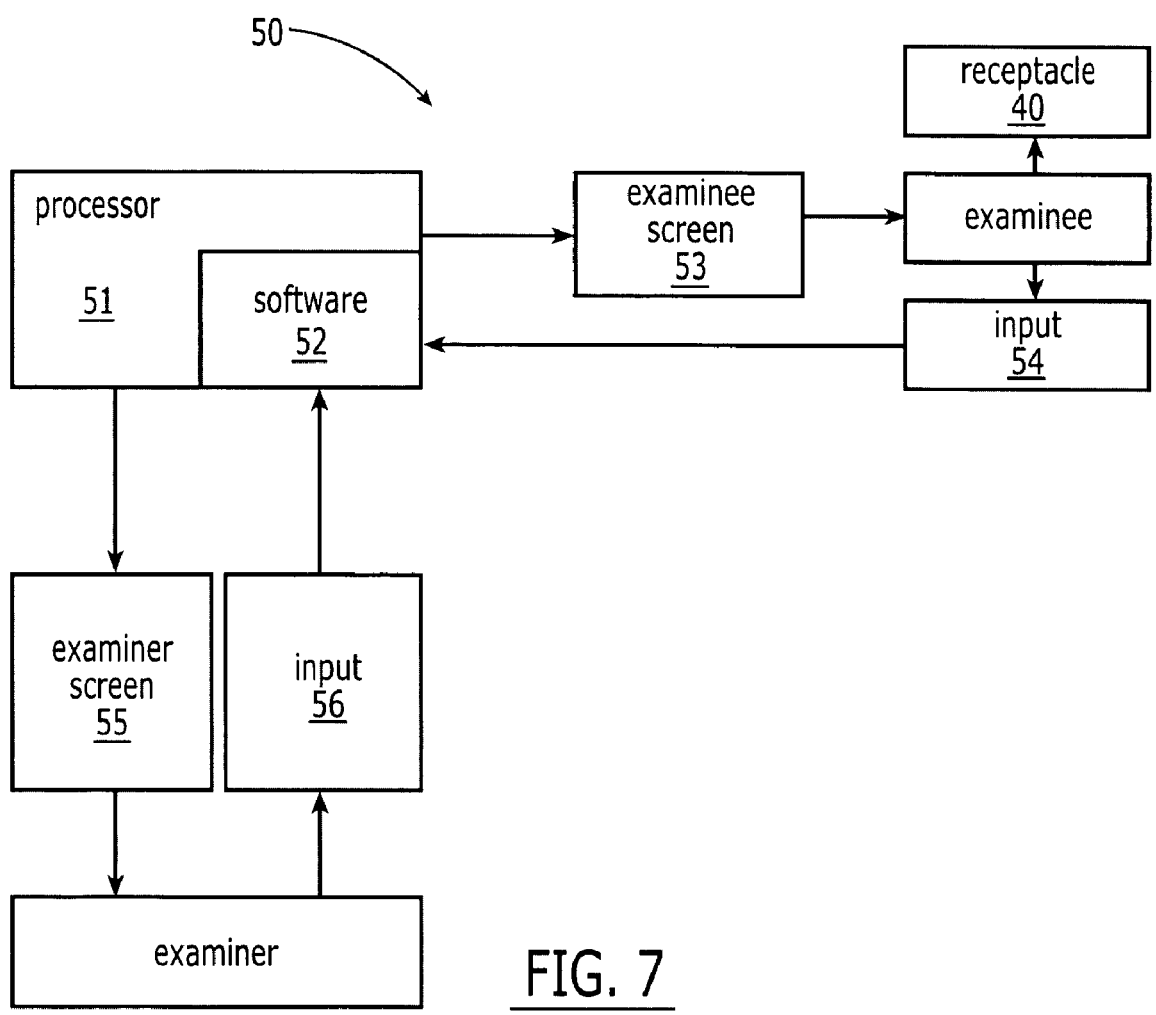
FIG. 7 is an exemplary system schematic for an electronically administered version of the assessment.

In an alternate embodiment of the invention, the assessment is conducted partially or wholly via electronic means. An exemplary system 50 for administering such an assessment is illustrated in FIG. 7. This system 50 includes a processor 51 on which is resident software 52 adapted for administering an assessment analogous to the above. Several subembodiments of the invention may be contemplated by one of skill in the art. For example, the system 50 can be adapted to administer the assessment entirely electronically, with a display of images revealed to the examinee on a screen 53 in signal communication with the processor 51. After a predetermined viewing time, the display of images is removed from the screen 53, and an electronic image of the receptacle 40 appears, along with a set of cards, which are movable using an input device such as a mouse 54. Scoring could then be accomplished electronically.

In another subembodiment, the examiner is provided with either another screen 55 or an administration manual from which to conduct the administration of the trial, and the examinee is provided with physical cards 10–29 and receptacle 40, with recordation occurring either manually as above or electronically on the examiner screen 55 via an input 56.

It will be appreciated by one of skill in the art that the present invention addresses problems encountered with previous assessment systems and methods by increasing speed and efficiency of administration and recordation, and optimizing accuracy of results. The receptacle of the invention further prevents an examinee from placing more than one card in a depression.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A neuropsychological assessment comprising:
    a plurality of cards, each card having a unique first indicium on a top face and a corresponding unique index indicium on a bottom face, each index indicium positioned in a substantively same location on each card;
    a display comprising an arrangement of a plurality of images, each image corresponding to one and only one of the first indicia, a number or the images fewer than or equal to a number of the cards;
    a substantially planar receptacle comprising a plurality of depressions dimensioned for holding a unitary card therein, each depression having an aperture therethrough positioned commensurate with the location of the index indicium, at least some of the depressions positioned analogously to the display arrangement; and
    means for administering a trial comprising a display revealable to an examinee for a first predetermined period of time, and removable from examinee view, and means for communicating to the examinee an instruction to reproduce the arrangement of the plurality of images by selecting a card having a first indicium corresponding to an image and placing the selected card within a selected a depression on the receptacle, the selected depression position corresponding to a position of the corresponding image on the display.

2. The neuropsychological assessment recited in claim 1, wherein each first indicium comprises an image.

3. The neuropsychological assessment recited in claim 2, wherein each index indicium comprises one of a number and a letter.

4. The neuropsychological assessment recited in claim 1, wherein the depressions are arranged in a grid pattern.

5. The neuropsychological assessment recited in claim 1, wherein each depression is dimensioned for holding a card with sufficient force that the card is retainable within the depression if the receptacle is turned over.

6. The neuropsychological assessment recited in claim 1, wherein the display comprises one of a chart and a screen.

7. The neuropsychological assessment recited in claim 1, further comprising a score recordation device comprising an image of the receptacle and means for recording on the image a location and value of each index indicium visible through the apertures on the receptacle.

8. A method for administering a neuropsychological assessment comprising the steps of:
revealing to an examinee display for a first predetermined period of time, the display comprising an arrangement of plurality of unique images;
removing the display from examinee view;
providing the examinee with a plurality of card having a unique first indicium on a top face and a corresponding unique index indicium on a bottom face, each index indicium positioned in a substantially same location on each card, each of a first subset of the cards having a first indicium corresponding to a unitary one of the images, each of a second subset of the cards having a first indicium not corresponding to any of the images, a number of the cards greater than a number of images;
instructing the examinee to reproduce the arrangement of the plurality of images by selecting a card having a first indicium corresponding to an image and placing the selected card within a selected depression on a substantially planar receptacle, each depression dimensioned for holding a unitary card therein, each depression having an aperture therethrough positioned commensurate with the location of an index indicium, the selected depression in a position corresponding to a corresponding image on the display.

9. The neuropsychological assessment administering method recited in claim 8, wherein each first comprises an image.

10. The neuropsychological assessment administering method recited in claim 9, wherein each index indicium comprises one of a number and a letter.

11. The neuropsychological assessment administering method recited in claim 8, wherein the depressions are arranged in a grid pattern.

12. The neuropsychological assessment administering method recited in claim 8, wherein each depression is dimensioned for holding a card with sufficient force that the card is retainable within the depression if the receptacle is turned over.

13. The neuropsychological assessment administering method recited in claim 8, wherein the revealing step comprises displaying to the examinee one of a chart and a screen.

14. The neuropsychological assessment administering method recited in claim 8, further comprising the step of imposing a delay between the removing step and the instructing step.

15. The neuropsychological assessment administering method recited in claim 8, further comprising the steps:
permitting the examinee to reproduce the arrangement;
viewing the index indicia through the apertures on the receptacle; and
recording a score following the permitting step by recording on an image of the receptacle a location and value of each index indicium viewed through the receptacle apertures.

* * * * *